(12) United States Patent
Smith

(10) Patent No.: US 7,217,017 B2
(45) Date of Patent: May 15, 2007

(54) VANITY FOR A VEHICLE

(75) Inventor: Nels R. Smith, Zeeland, MI (US)

(73) Assignee: Johnson Controls Technology Company, Holland, MI (US)

(*) Notice: Subject to any disclaimer, the term of this patent is extended or adjusted under 35 U.S.C. 154(b) by 176 days.

(21) Appl. No.: 10/903,778

(22) Filed: Jul. 30, 2004

(65) Prior Publication Data

US 2005/0047159 A1 Mar. 3, 2005

Related U.S. Application Data

(60) Provisional application No. 60/497,597, filed on Aug. 25, 2003.

(51) Int. Cl.
*B60Q 1/00* (2006.01)
*B60Q 1/26* (2006.01)
*B60J 3/00* (2006.01)

(52) U.S. Cl. ............... 362/492; 362/135; 362/136; 296/97.1; 296/97.6; 359/838

(58) Field of Classification Search ........... 362/492, 362/494, 516, 136, 135, 144, 328, 359, 351; 296/97.5, 153, 97.1, 97.6; 359/838
See application file for complete search history.

(56) References Cited

U.S. PATENT DOCUMENTS

| | | | | |
|---|---|---|---|---|
| 2,894,576 | A | * | 7/1959 | Williams .................. 160/220 |
| 3,877,745 | A | * | 4/1975 | Girard ...................... 296/97.6 |
| 4,486,819 | A | * | 12/1984 | Marcus et al. ............. 362/492 |
| 4,511,954 | A | * | 4/1985 | Marcus et al. ............. 362/492 |
| 4,624,499 | A | * | 11/1986 | Flowerday ................ 296/97.5 |
| 4,648,011 | A | | 3/1987 | Boote et al. |
| 4,734,831 | A | * | 3/1988 | Keyser et al. ............. 362/492 |
| 4,751,618 | A | | 6/1988 | Iacovelli |
| 4,760,503 | A | | 7/1988 | VandenBerge et al. |
| 4,807,093 | A | | 2/1989 | Cisler |
| 4,824,159 | A | | 4/1989 | Fluharty et al. |
| 4,866,579 | A | | 9/1989 | Miller et al. |
| 4,922,391 | A | | 5/1990 | Dykstra |
| 5,039,153 | A | | 8/1991 | Lindberg et al. |
| 5,067,764 | A | | 11/1991 | Lanser et al. |
| 5,078,445 | A | | 1/1992 | VandenBerge et al. |
| 5,098,150 | A | | 3/1992 | Smith et al. |
| 5,117,337 | A | | 5/1992 | Sakuma |
| 5,162,950 | A | | 11/1992 | Suman et al. |
| 5,174,644 | A | | 12/1992 | Hermansson et al. |

(Continued)

*Primary Examiner*—Sandra O'Shea
*Assistant Examiner*—Jacob Y. Choi
(74) *Attorney, Agent, or Firm*—Foley & Lardner LLP (57) ABSTRACT

A vanity is disclosed having a mirror and a light source adjacent the mirror to illuminate an object to be viewed in the mirror. A cover panel is coupled adjacent to the light source for movement to an open position to reveal the mirror and a closed position to conceal the mirror. The vanity includes a switch device to activate and deactivate the light source and a positioning device to maintain the cover panel in the open or closed position. The switch device and the positioning device cooperate to activate the light source when the cover panel is in the open position and to deactivate the light source when the cover panel is not in the open position. The cover panel is configured for rotational movement between the open and closed position in a plane generally parallel to a plane of the mirror.

16 Claims, 14 Drawing Sheets

U.S. PATENT DOCUMENTS

| | | |
|---|---|---|
| 5,182,675 A | 1/1993 | Arbisi et al. |
| 5,186,442 A | 2/1993 | Smith |
| 5,188,446 A | 2/1993 | Miller |
| 5,197,777 A | 3/1993 | Lanser et al. |
| 5,203,623 A | 4/1993 | Viertel et al. |
| 5,230,546 A | 7/1993 | Smith et al. |
| 5,265,929 A * | 11/1993 | Pelham ................... 296/97.6 |
| 5,283,720 A | 2/1994 | Boerema et al. |
| 5,329,430 A | 7/1994 | Lanser et al. |
| 5,331,518 A | 7/1994 | Roark et al. |
| 5,374,097 A | 12/1994 | George et al. |
| 5,401,073 A | 3/1995 | Viertel et al. |
| 5,428,513 A | 6/1995 | Hiemstra et al. |
| 5,431,473 A | 7/1995 | Hiemstra |
| 5,441,325 A | 8/1995 | Toth et al. |
| 5,442,530 A | 8/1995 | Viertel et al. |
| 5,473,516 A | 12/1995 | Van Order et al. |
| 5,533,776 A | 7/1996 | Agro et al. |
| 5,560,704 A | 10/1996 | Hiemstra et al. |
| 5,577,791 A | 11/1996 | Viertel et al. |
| 5,685,629 A | 11/1997 | Hemmeke et al. |
| 5,727,837 A | 3/1998 | Viertel |
| 5,871,251 A | 2/1999 | Welling et al. |
| 5,940,120 A | 8/1999 | Frankhouse et al. |
| 5,975,708 A | 11/1999 | Fitzpatrick et al. |
| 6,203,161 B1 * | 3/2001 | Busch et al. ................. 359/844 |
| 6,231,105 B1 | 5/2001 | Viertel |
| 6,264,352 B1 * | 7/2001 | Zapinski ................... 362/492 |
| 6,325,527 B1 | 12/2001 | Lee |
| 6,386,741 B1 | 5/2002 | Jones et al. |
| 6,435,593 B2 | 8/2002 | Welter |
| 6,637,799 B1 | 10/2003 | Tiesler |
| 6,669,859 B1 | 12/2003 | Tiesler |
| 2004/0155489 A1 | 8/2004 | Kawasaki |

\* cited by examiner

VANITY FOR A VEHICLE

CROSS REFERENCE TO RELATED APPLICATIONS

The present Application claims the benefit of priority, as available under 35 U.S.C. § 119(e)(1), to U.S. Provisional Patent Application No. 60/497,597 titled "Vanity for a Vehicle" filed on Aug. 25, 2003 (which is incorporated by reference in its entirety).

FIELD

The present invention relates to a vanity for use in a vehicle. The present invention relates more particularly to a lighted vanity for use in a vehicle. The present invention relates more particularly to a lighted vanity having a trim piece that is rotational to selectively cover and expose a mirror and to actuate a lighting system.

BACKGROUND

Vanities for use within vehicles are generally known and are typically provided on one side of a visor so that the visor may be folded-down to expose the vanity. The generally known vanities typically include a mirror having a lighting system with a light source such as a bulb and lens located adjacent to the mirror for illuminating an object to be viewed in the mirror. Such vanities also typically include a cover panel that is hinged adjacent to one end of the mirror so that when the visor is folded down, the cover panel may be opened to expose the mirror and the light source for use by an occupant of the vehicle and then folded closed to conceal the mirror.

However, such known vanities typically require a space adjacent to the visor and vanity within which the cover panel is configured to move about the hinges for exposing and concealing the mirror.

Accordingly, it would be advantageous to provide a vanity for a vehicle that provides a cover panel and a mirror that do not require a space adjacent to the mirror for movement of the cover panel between an open position to reveal the mirror and a closed position to conceal the mirror. It would also be advantageous to provide a vanity for a vehicle having a cover panel that is configured to rotate in plane generally parallel to a plane of the mirror to selectively conceal and reveal the mirror. It would be further advantageous to provide a vanity for a vehicle having a cover panel that activates a lighting system when the cover panel is opened, and that deactivates the lighting system when the cover is closed. It would be further advantageous to provide a vanity for a vehicle having a positioning device for maintaining the position of the cover panel in one of the open position and the closed position. It would be further advantageous to provide a vanity for a vehicle having a switch device that is integrated with the positioning device to activate the lighting system and illuminate objects for viewing in the mirror when the cover panel is moved to the open position, and to deactivate the lighting system when the cover panel is moved away from the open position.

Accordingly, it would be advantageous to provide a vanity for a vehicle having any one or more of these or other advantageous features.

SUMMARY

The present invention relates to a vanity assembly for use within a vehicle. The assembly includes a mirror and a light source having a lens adjacent to the mirror. A cover panel is configured for rotational movement between a first position where the mirror is concealed and a second position where the mirror is revealed. A positioning system is coupled to the cover panel to maintain the cover panel in one of a plurality of positions. A switch device provides electricity to the light source when the cover panel is in the second position where the mirror is revealed.

The present invention also relates to a vanity for a visor in a vehicle. The vanity includes a mirror coupled to the visor and a light source coupled to the visor adjacent the mirror. A panel is coupled to the panel for movement in a plane substantially parallel to a plane of the mirror. A switch device interfaces with the light source and the panel, so that the mirror is capable of rotation from a first position where the mirror is substantially covered by the panel and the switch device prevents illumination of the light source, and a second position where the mirror is substantially uncovered and the switch device permits illumination of the light source.

The present invention also relates to a vanity for use on a panel in a vehicle. The vanity includes a mirror coupled to the panel, and a light source adjacent to the mirror, and a cover having a size and a shape configured to substantially cover the mirror. A positioning system permits rotation of the cover in a plane substantially parallel to a plane of the panel. A switch device interacts with the positioning system to control illumination of the light source, so that rotation of the cover in a first direction exposes the mirror and energizes the light source and rotation of the cover in a second direction conceals the mirror and de-energizes the light source.

DETAILED DESCRIPTION

The visor for a vehicle is shown and described for use with a visor for a vehicle. However, the description of the various embodiments of the vanity are also applicable to other panels or trim components in other locations within a vehicle, such a door panels, cargo storage areas, seat backs, side panels, instrument panels, etc.

Figure 1:
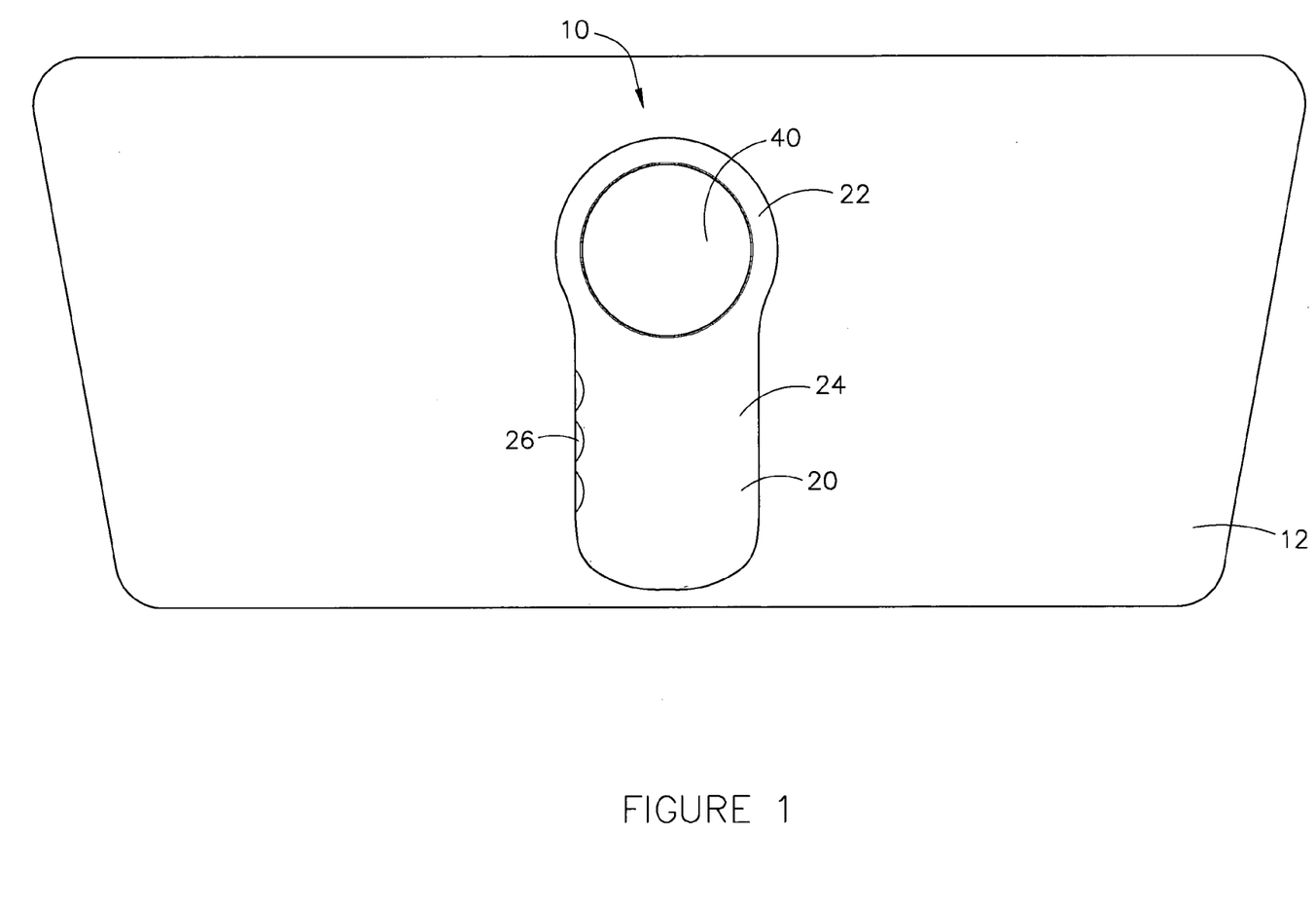
FIG. 1 is a schematic representation of a front view of a vanity for a vehicle having a cover panel in a closed position according to an embodiment.
Figure 2:
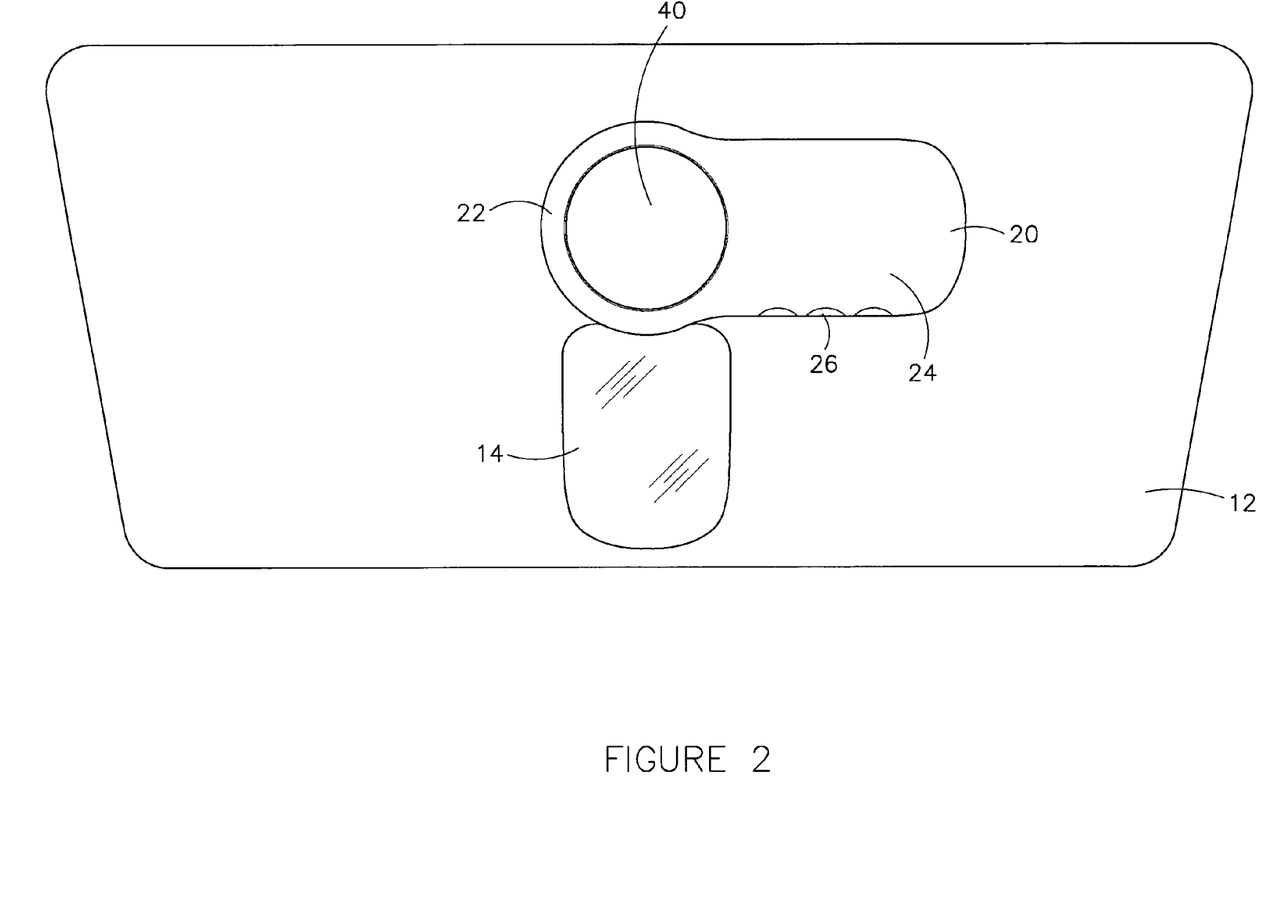
FIG. 2 is a schematic representation of a front view of a vanity for a vehicle having a cover panel in an open position according to the embodiment of FIG. 1.

Referring to FIGS. 1 and 2, a vanity for a vehicle is shown according to one embodiment. Vanity 10 is provided on a panel 12 (such as a "visor") and includes a mirror 14, a trim piece (shown as a cover panel 20), a light cover (shown as a "lens" 40) and a lighting system 60. According to the embodiment, the cover panel 20 is shown having a first portion 22 that is generally circular-shaped (e.g. ring, collar, etc.) and configured to at least partially surrounds the lens 40 in a movable (e.g. rotational, pivotal) manner. Cover panel 20 includes a second portion 24 having a shape (e.g. shown as generally rectangular in FIG. 1) configured to conceal the mirror 14 when the cover panel 20 is in a closed position. The cover panel 20 is configured for rotation about the lens 40 in a plane generally parallel to the mirror and/or visor, between a closed position (shown in FIG. 1) to conceal the mirror, an open position (shown in FIG. 2) to expose or reveal the mirror 14 and to activate the lighting system 60 to illuminate an object (e.g. an occupant of the vehicle, etc.) for viewing in the mirror. The cover panel 20 is further configured for movement to a plurality of intermediate positions between the open position and the closed position. According to the embodiment shown in FIGS. 1 and 2, the cover panel 20 is rotatable within a range of approximately 90 degrees, however, other ranges of motion may be provided. The second portion 24 of the cover panel 20 may be provided with contours such as shown by indentations 26 intended to provide a convenient location to "grip" or otherwise hold the cover panel for movement. According to the embodiment, the lens 40 is made of a polycarbonate material in an injection molding process, however, the lens may be formed of other suitable materials (such as plastic, etc.) in any suitable forming operation.

Figure 3:
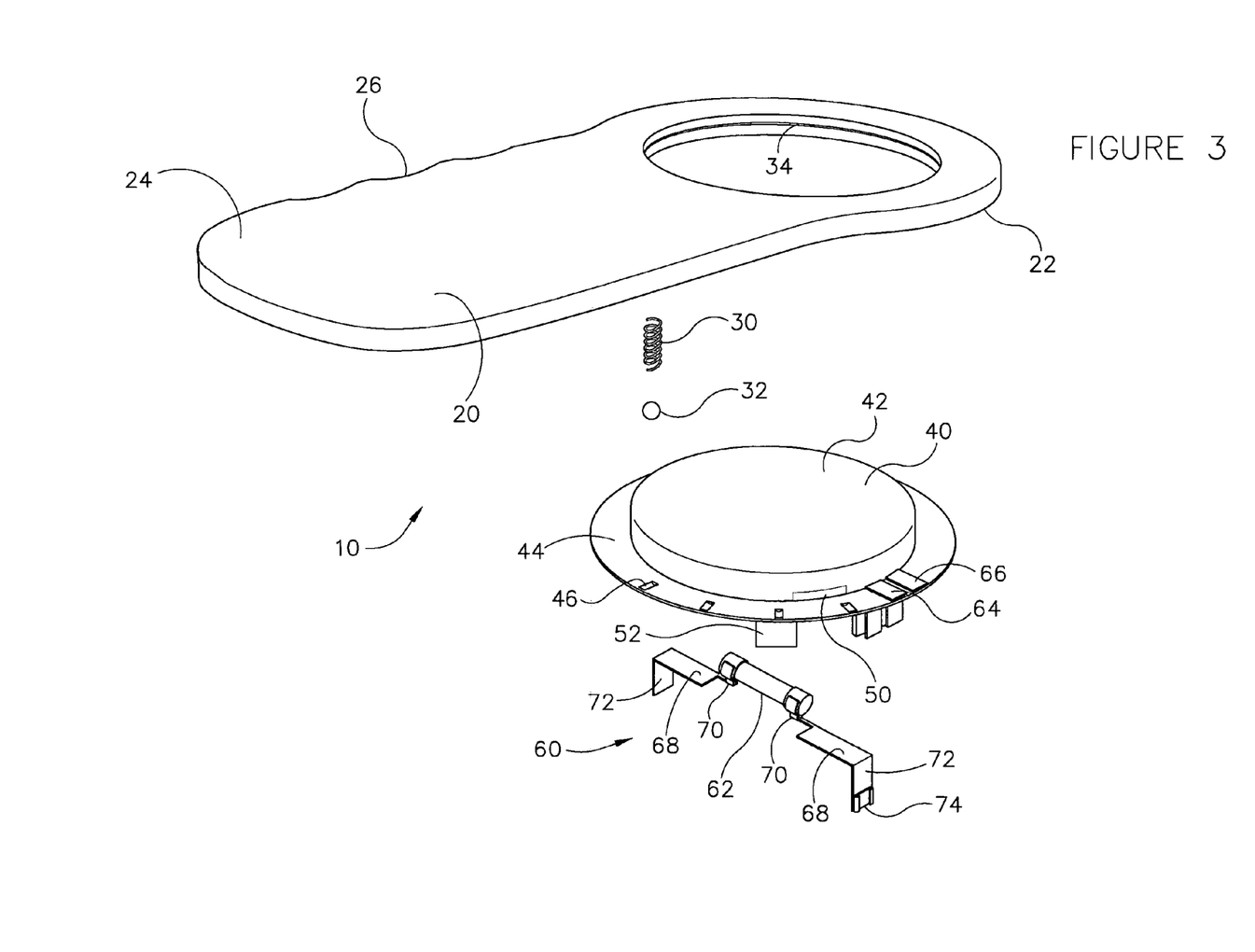
FIG. 3 is a schematic representation of an exploded front perspective view of a vanity according to the embodiment of FIG. 1.
Figure 4:
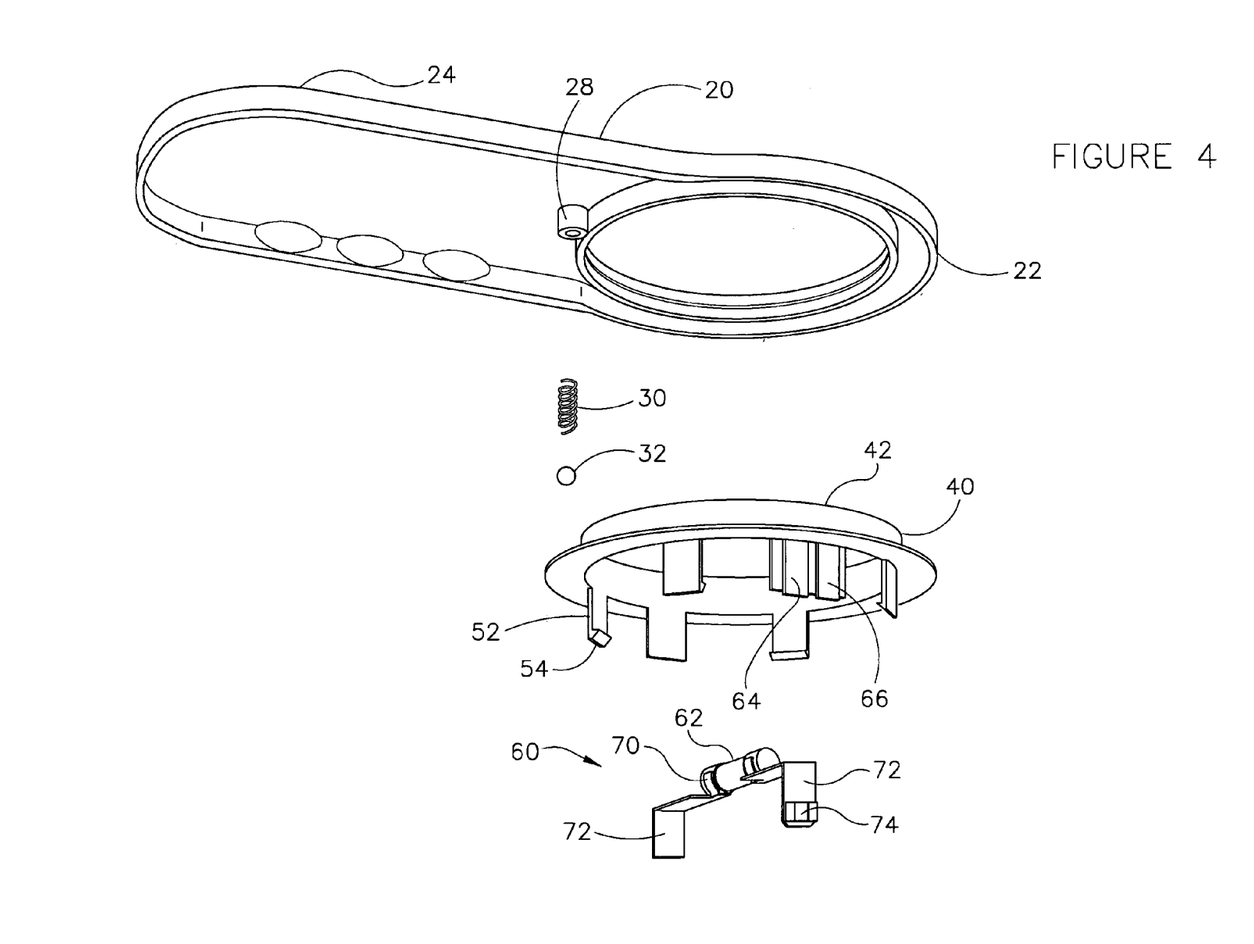
FIG. 4 is a schematic representation of an exploded back perspective view of a vanity according to the embodiment of FIG. 1.
Figure 5:
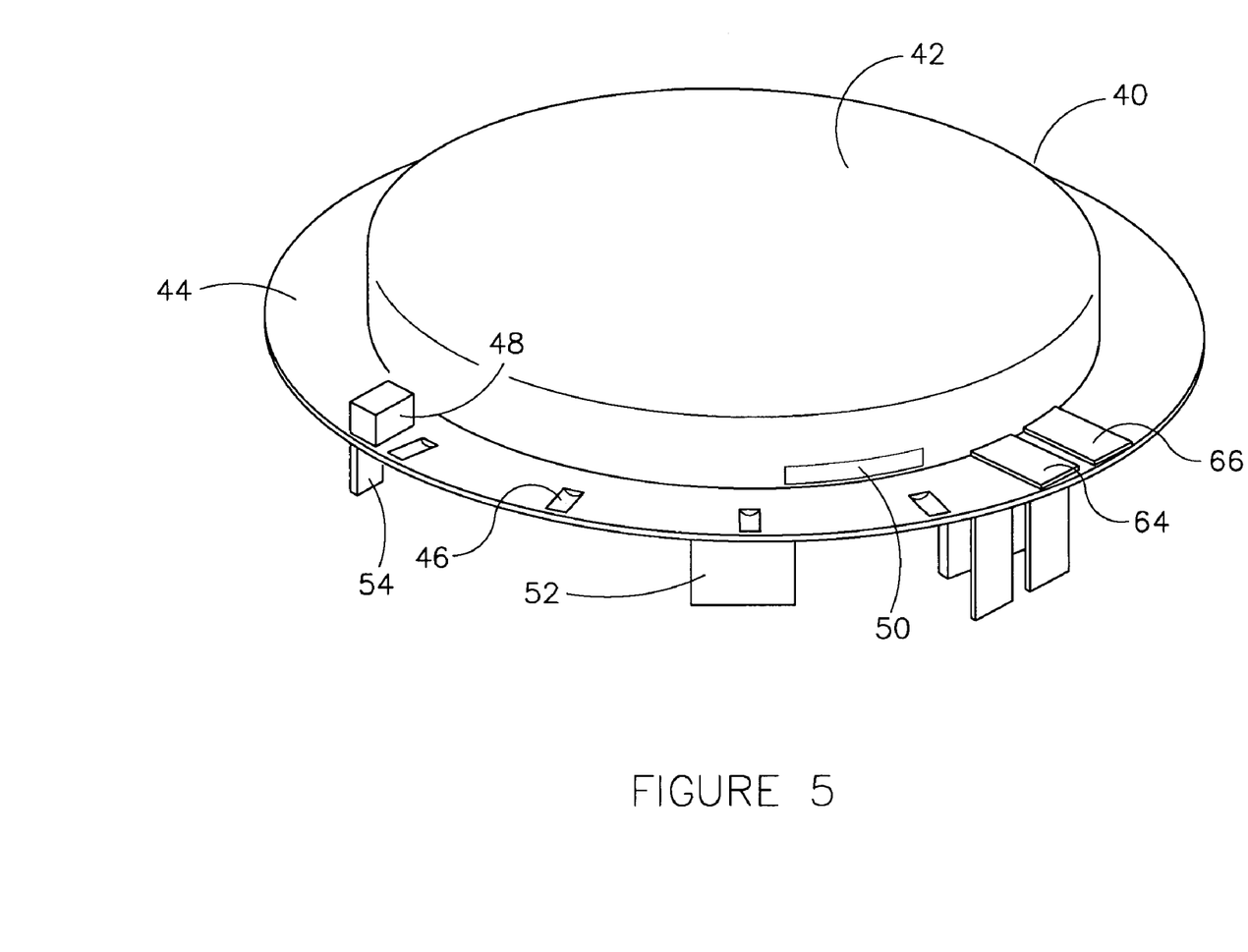
FIG. 5 is a schematic representation of a front perspective view of a portion of a lighting system for a vanity according to an embodiment.

Referring to FIGS. 3 through 5, the positioning system for the vanity is shown according to an embodiment. Cover panel 20 includes a holder 28 (shown as a cylindrical member in FIG. 4) positioned on an underside of the cover panel 20 proximate the first portion 22. A biasing member (shown as spring 30) and a positioning member (shown as a "ball" 32) are retained within the holder 28 in a manner that biases the ball 32 into contact with the lens 40. Lens 40 includes a dome portion 42 configured to house a light source 62, and a track portion 44 (e.g. flange, rim, shoulder, etc.). Track portion 44 includes a plurality of recesses (e.g. indentations, pockets, etc., shown as grooves 46) located along the track 44 at locations corresponding to the open position, the closed position and various intermediate positions of the cover panel 20 relative to the lens 40. When the cover panel 20 is assembled with the lens 40, the ball 32 is biased into engagement with the track 44 and is configured for engagement with the grooves 46 to act as a detent and maintain the rotational position of the cover panel 20 relative to the lens 40 in a particular position as the cover panel 20 is moved between the open position and the closed position. A rotational limit member 48 (e.g. lug, stop, etc.) may be provided on either the cover panel or the lens to limit movement of the cover panel 20 relative to the lens 40 to a predetermined range of motion (shown as a rotational travel range of approximately 90 degrees). The sides of the dome portion 42 of the lens 40 are shown as provided with retention devices 50 (e.g. projections, "snap heads," etc.) that are configured to permit the first portion 22 of the cover panel 20 to be placed over the dome portion 42 with a "snap-fit" engagement and then rotated relative to the dome portion 42 so that the cover panel 20 remains coupled for rotation with the lens 40. Lens 40 further includes retention members 52 (e.g. projections, "snap legs," etc.) having suitable projecting structure 54 (shown schematically as hooks, barbs, ribs, ridges, etc. in FIG. 4) that are configured for securing the lens 40 to the visor 10 (to be further described).

Figure 6:
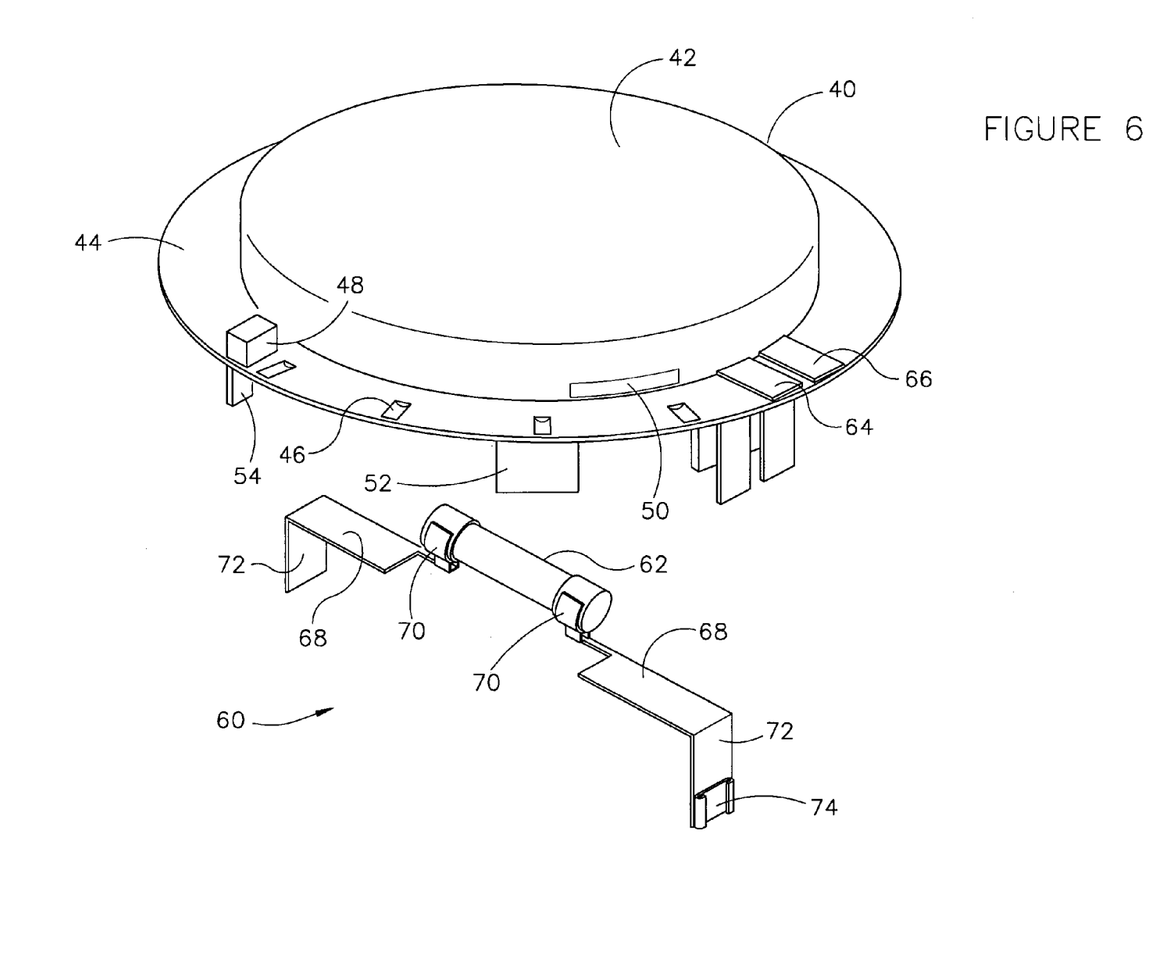
FIG. 6 is a schematic representation of an exploded front perspective view of a portion of a lighting system for a vanity according to the embodiment of FIG. 5.
Figure 7:
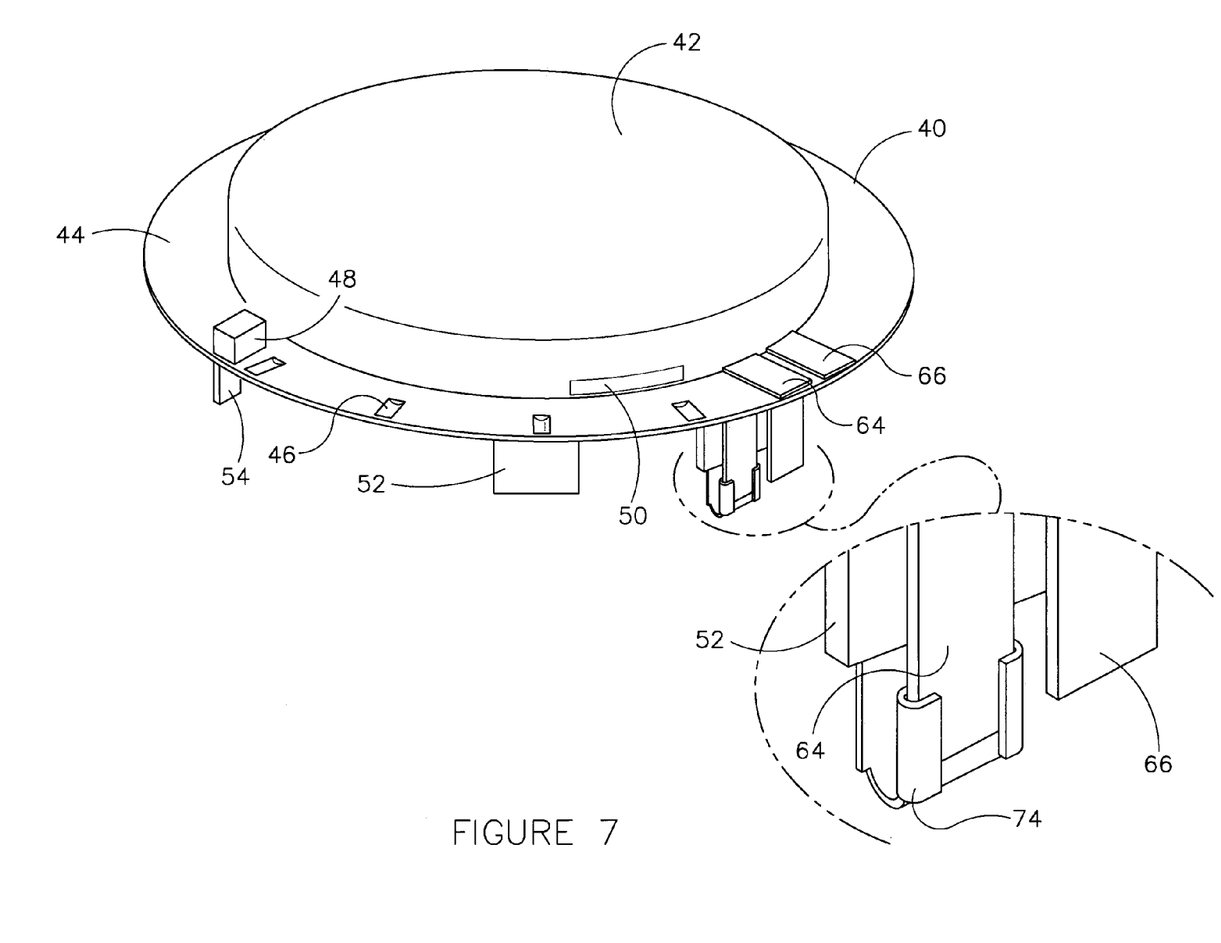
FIG. 7 is a schematic representation of an exploded front perspective view of a portion of a lighting system for a vanity according to the embodiment of FIG. 5.

Referring to FIGS. 6 and 7, a portion of the lighting system 60 for the vanity is shown according to an embodiment. The lens 40 includes circuitry configured to operably engage corresponding circuitry in the visor 12 when the lens 40 is assembled to the visor 12. Lens 40 includes a first electrical contact 64 (shown for engagement with light source 62) and a second electrical contact 66 (shown for engagement with conductive members associated with an electrical power supply for the vehicle). The first contact 64 and the second contact 66 are shown located on opposite sides of the groove 46 corresponding to the open position of the cover panel. The first and second electrical contacts 64, 66 are metallic stampings (e.g. made from brass, copper, aluminum, etc.) that are assembled (e.g. "press fit," etc.) on to the track portion 44 of lens 40. According to an alternative embodiment, the first and second electrical contacts may be "insert molded" within the lens. The light source 62 (shown as a bulb) is provided with conductive members (e.g. brackets 68 shown as "brass stampings") having a first end 70 configured to contact and hold the light source 62 and a second end 72 configured for engagement with circuit portions of the lighting system. According to one embodiment, the second end 72 of brackets 68 is shaped in the form of a resilient clip 74 that is configured to engage circuitry provided on the dome (shown in FIGS. 7 and 9 as engageable with first electrical contact 64 on one side of the lens 40, and shown in FIG. 9 as engageable with a return circuit on another location of the lens). The light source 62 is coupled to the lens 40 by press fit of the second end 72 of brackets 68 to their respective circuitry portions provided on the lens 40. According to an alternative embodiment the light source may be any suitable light source, such as one or more light emitting diodes (LEDs) and provided in any suitable number, arrangement and color.

Figure 8:
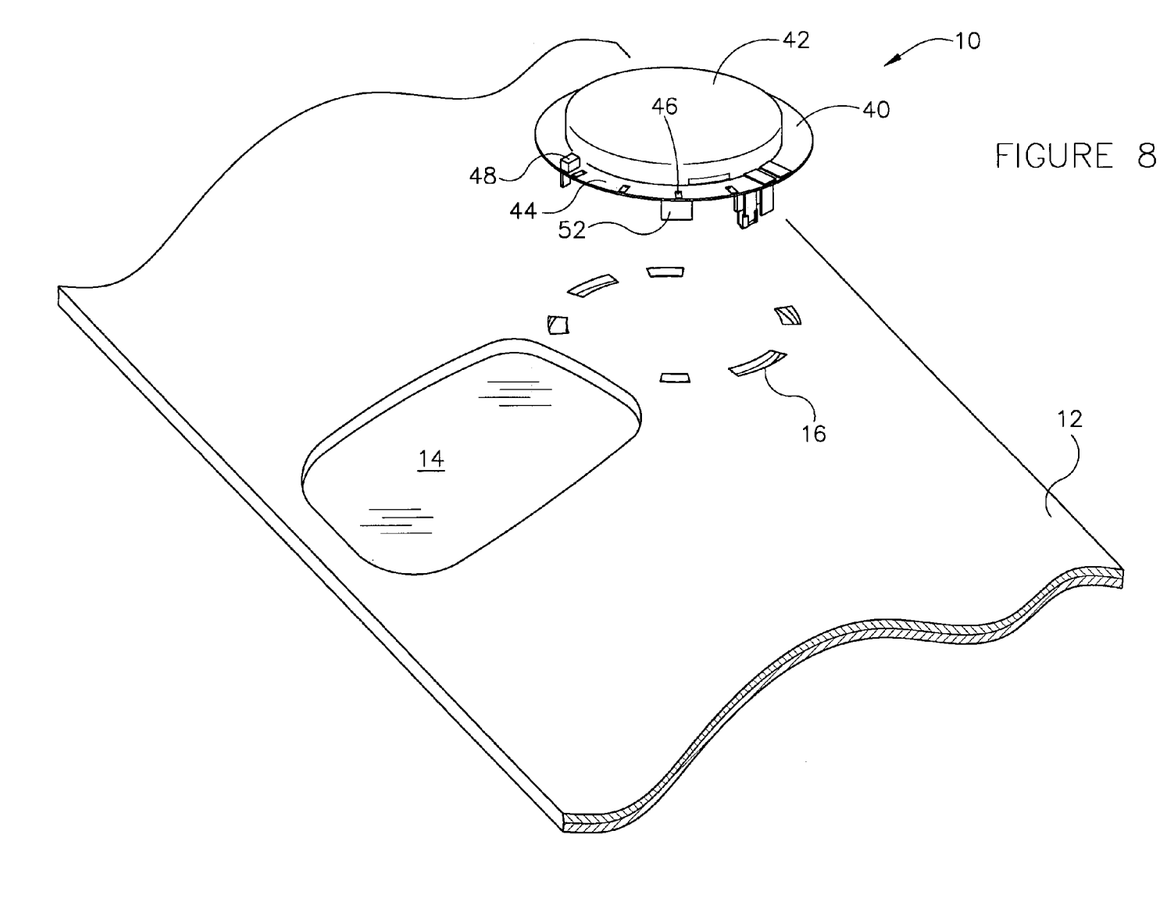
FIG. 8 is a schematic representation of an exploded front perspective view of a portion of a lighting system for a vanity and a panel for a vehicle according to an embodiment.
Figure 9:
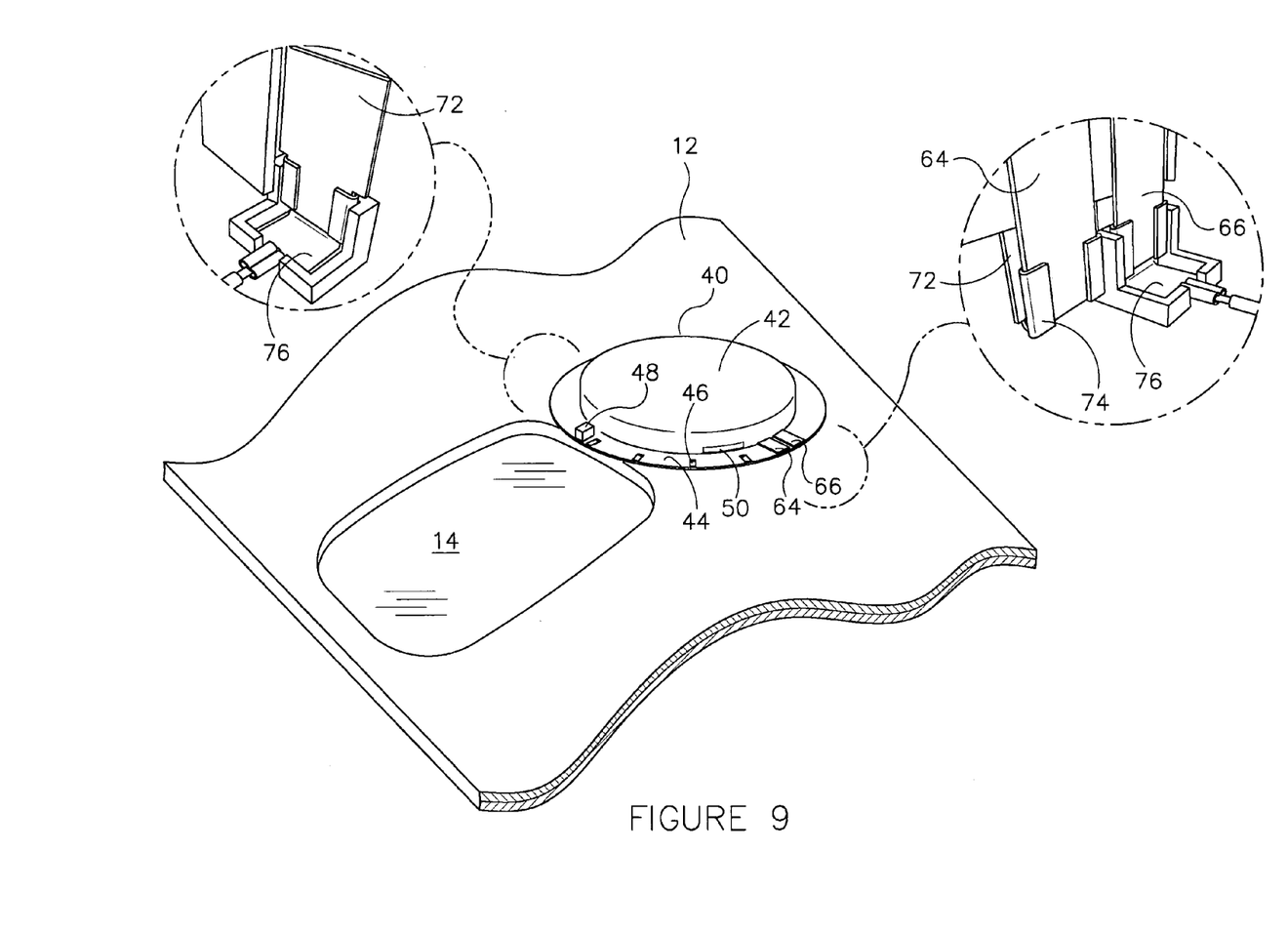
FIG. 9 is a schematic representation of an exploded front perspective view of a portion of a lighting system for a vanity and a panel for a vehicle according to the embodiment of FIG. 8.

Referring to FIGS. 8 and 9, attachment of the lens 40 to the visor 12 and connection of the circuitry for the lighting system 60 are shown according to a preferred embodiment. Visor 12 includes apertures 16 (shown as generally arcuate "slots" in FIG. 8) in a surface of a panel on one side of the visor 12 and positioned to correspond to the retention members 52 projecting from an underside of lens 40. The projecting structure 54 on the retention members 52 engage a "back" side of the panel within the body of visor 12 to retain the lens 40 on the visor 12. A source of electrical power (e.g. power and ground from a conventional battery of the vehicle—not shown) is provided to the visor 12 in a conventional manner (e.g. through wires, etc.) and includes connectors 76 positioned proximate suitable apertures 16 corresponding to the electrical contacts on the lens 40 and configured for engagement with electrical contacts from the lens 40 when the vanity 10 is assembled by inserting the retention members 52 into apertures 16 on the visor 12. According to any exemplary embodiment, the circuitry of the light source and the circuitry of the electrical power supply are configured to "mate" or otherwise engage for electrical connectivity when the lens is assembled onto the visor. According to an alternative embodiment, the lens may be attached to the visor in any suitable manner and the configuration of the electrical contacts may have any suitable form adapted to provide electrical connectivity between the lens and the visor when assembled.

Referring further to FIG. 8, the panel of the visor includes an opening configured for placement of the mirror (not shown) within the visor so that the mirror is selectively accessible by moving the cover panel between the closed position and the open position.

Figure 10:
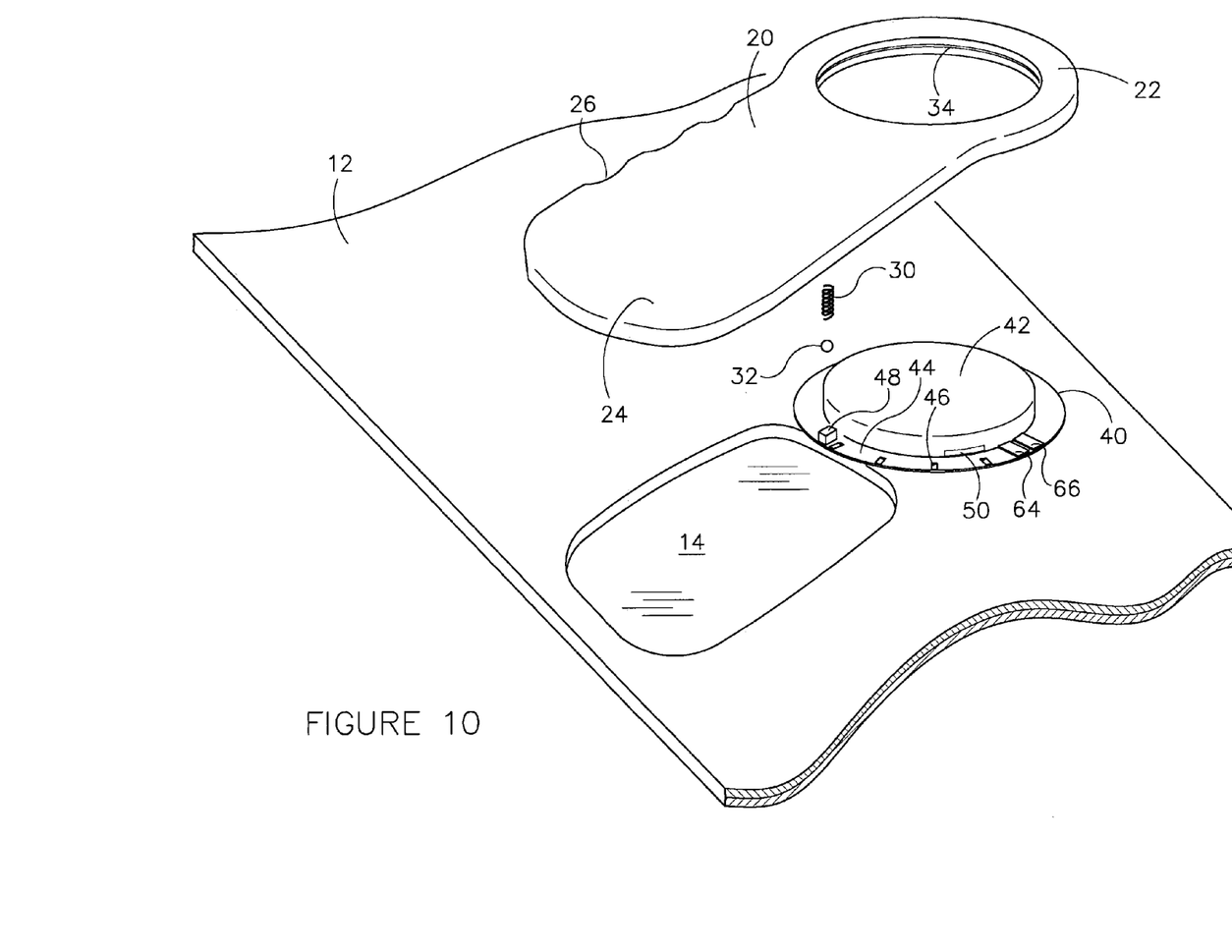
FIG. 10 is a schematic representation of an exploded front perspective view of a portion of a vanity with a positioning device and a panel for a vehicle according to the embodiment of FIG. 8.
Figure 11:
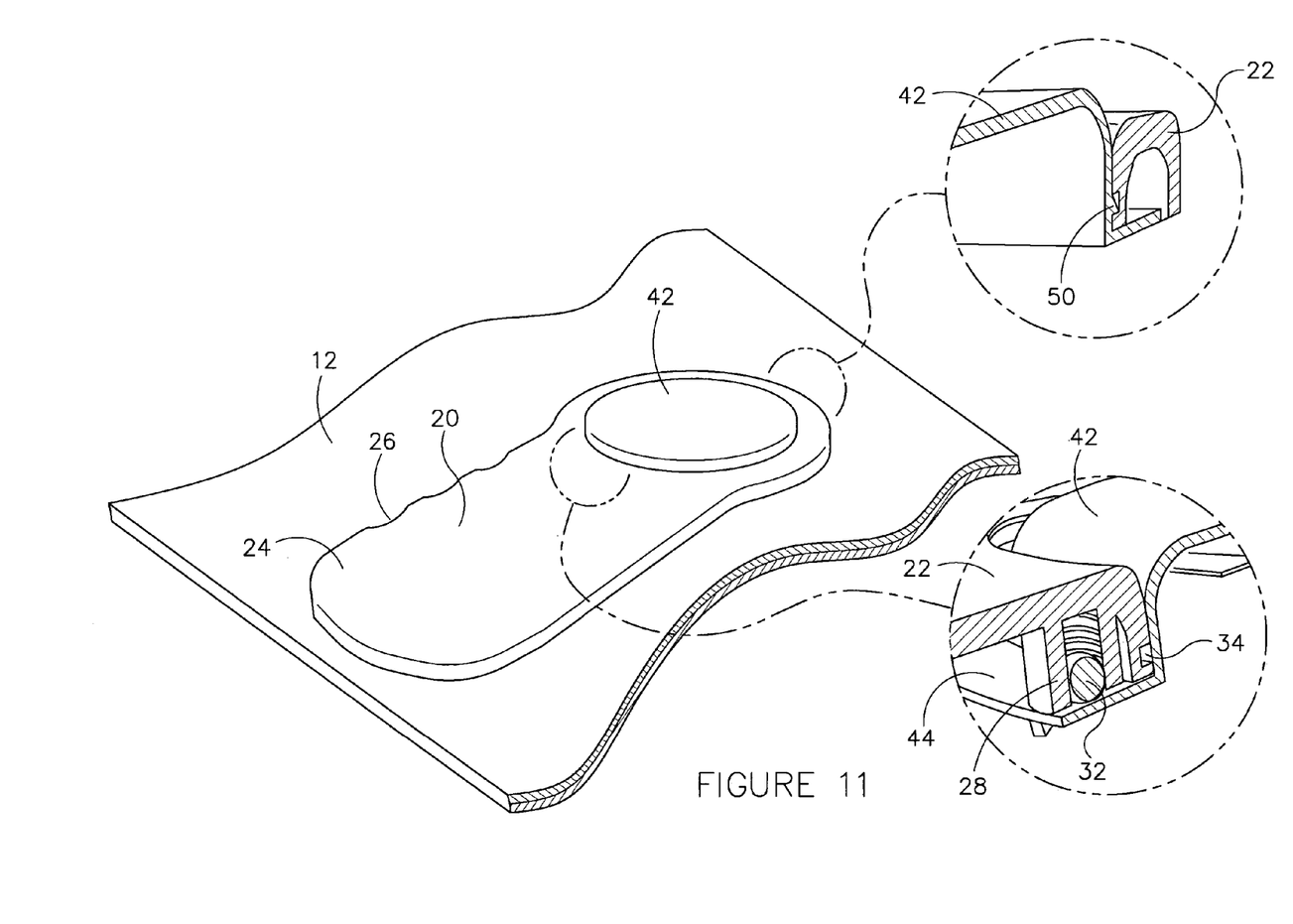
FIG. 11 is a schematic representation of a front perspective view of a portion of a vanity with a positioning device and a panel for a vehicle according to an embodiment.

Referring to FIGS. 10 and 11, assembly of the cover panel 20 to the visor 12 is shown according to an embodiment. After the lens 40 is attached to the visor 12, the cover panel 20 with the assembly of the spring 30 and ball 32 positioned in holder 28, is positioned with the first portion 22 over the lens 40 and the second portion 24 over the mirror (corresponding to the closed position as shown in FIG. 10). The first portion 22 of cover panel 20 includes a recess 34 (e.g. groove, slot, channel, etc.) configured for engagement with the retention devices 50. The cover panel 20 is assembled to the lens 40 by fitting the first portion 22 over the lens 40 and the retention devices 50 (e.g. by a "press-fit" or a "snap-fit") so that the cover panel 20 is secured to the lens 40 in a manner that permits rotational movement of the cover panel 20 relative to the lens 40 in the general plane of the visor 12 and mirror 16 by "sliding" of the retention devices 50 within the recess 34. Upon assembly of the cover panel 20 to the lens 40, the ball 32 is biased into engagement with the groove 46 (shown corresponding to the closed position in FIG. 10). As the cover panel 20 is rotated about the lens 40 between the open and closed positions, the ball 32 engages a groove 46 corresponding to one of the closed position, an intermediate position and the open position.

Figure 12:
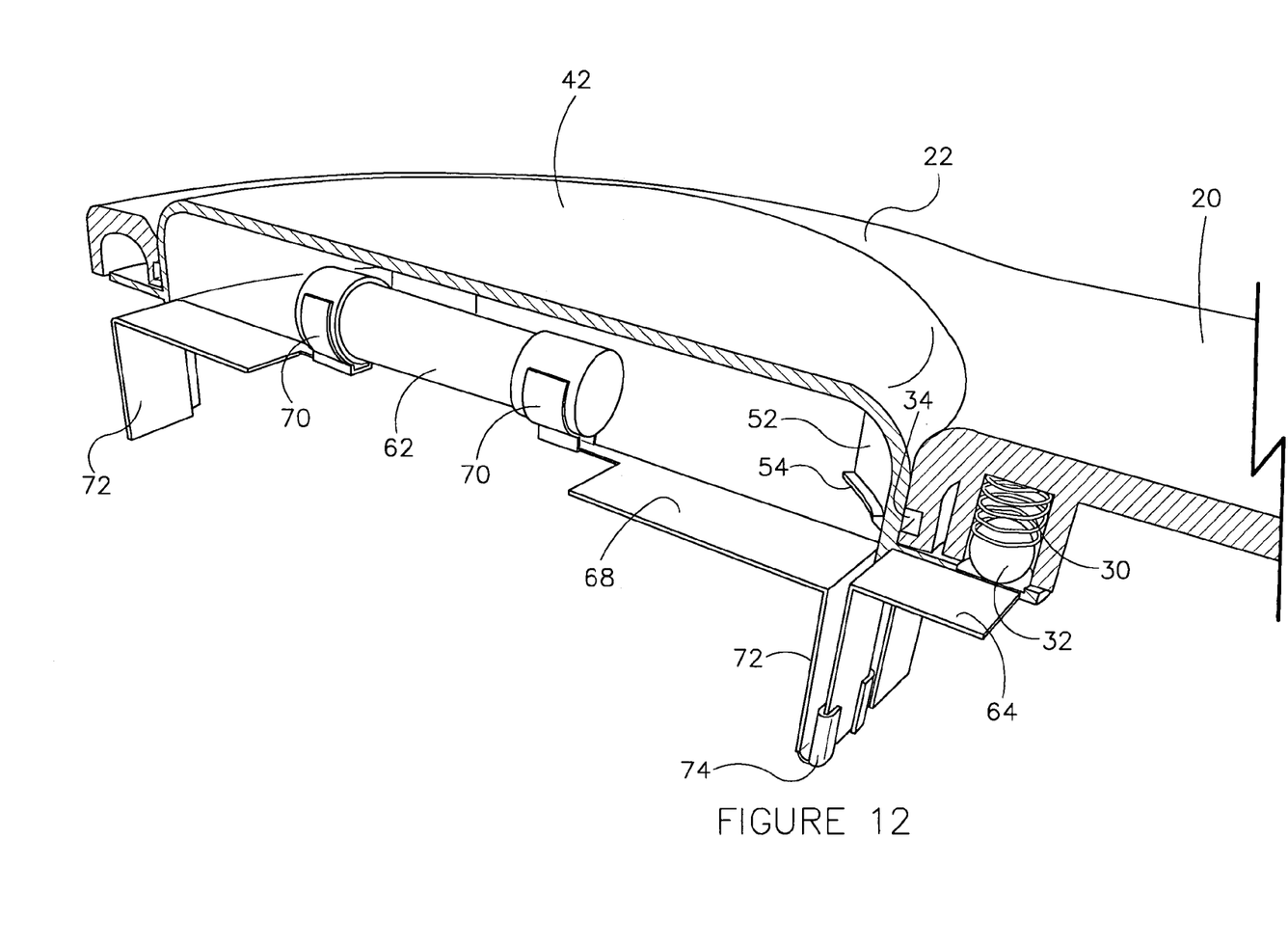
FIG. 12 is a schematic representation of a front perspective view of a cross section of a vanity for a vehicle according to the embodiment of FIG. 11.
Figure 13:
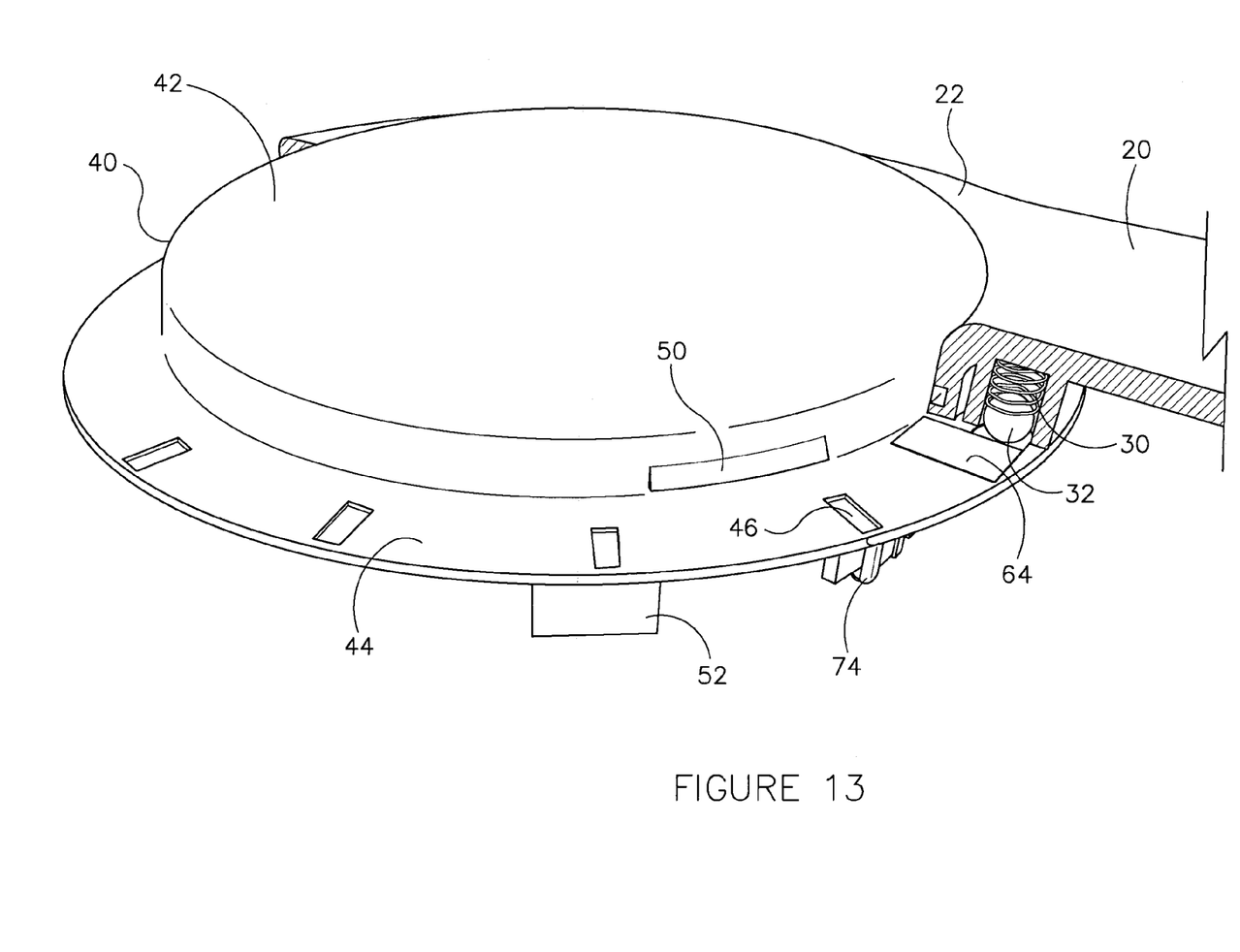
FIG. 13 is a schematic representation of a front perspective view of a switch device for a vanity for a vehicle according to the embodiment of FIG. 11.
Figure 14:
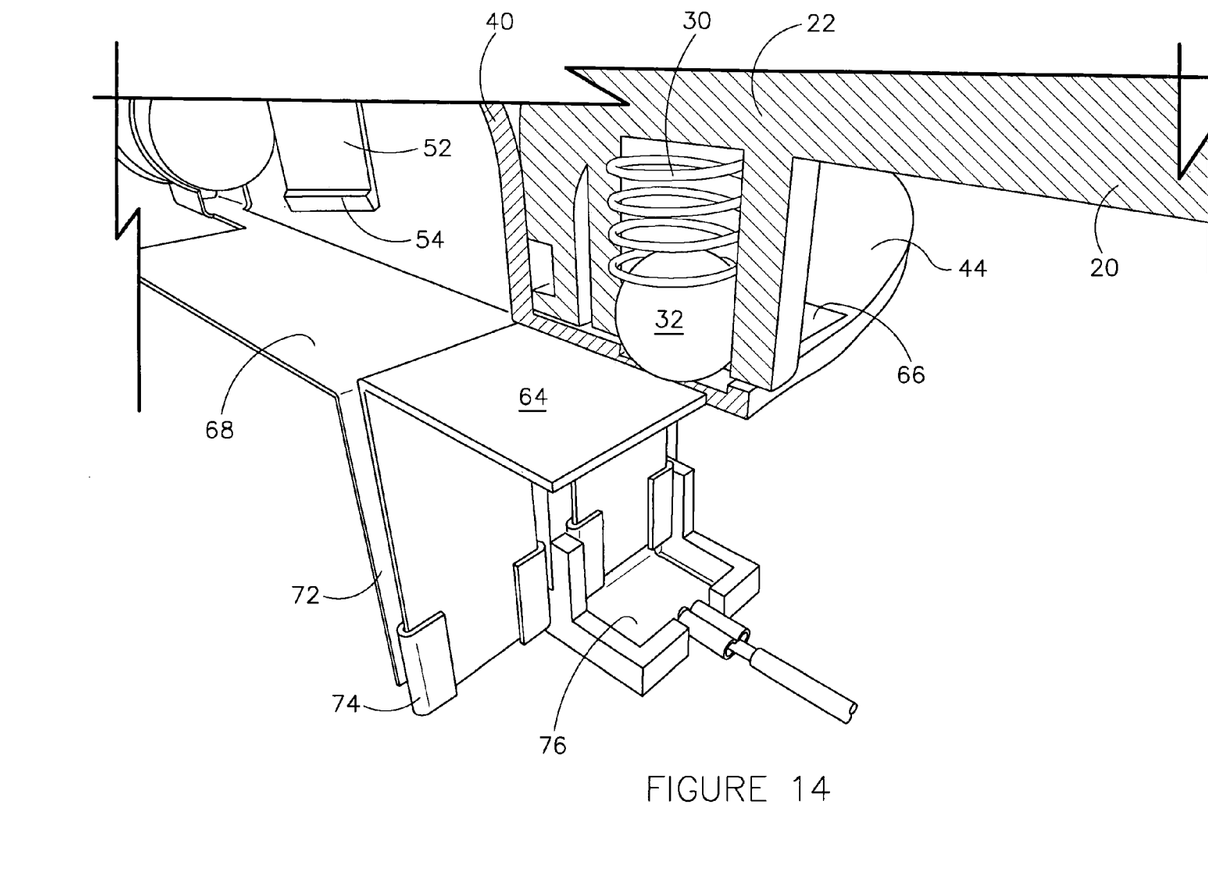
FIG. 14 is a schematic representation of a front perspective view of a switch device for a vanity for a vehicle according to the embodiment of FIG. 11.

Referring to FIGS. 12 through 14, the switch device for the vanity is shown according to an embodiment. Switch device 80 generally comprises the first contact 64, the second contact 66 and the ball 32. The ball 32 comprises an electrically conductive material or coating (e.g. brass, copper, aluminum, etc.). The first and second electrical contacts 64, 66 on the track 44 of the lens 40 are spaced to provide a "gap" therebetween coincident with a detent 46, so that the gap has a dimension that is less than the diameter of the ball 32. As the cover panel 20 is rotated to the open position, the ball 32 travels along the track 44 until the ball 32 is positioned (e.g. "seats") within the gap between, and in contact with, the first and second electrical contacts 64, 66. The electrical conductivity of the ball 32 "bridges" the gap to provide electrical connectivity between the first and second contacts 64, 66 to "make up" or "close" the circuit for the lighting system and illuminate the light source 62.

When the cover panel 20 is moved away from the open position, the ball 32 leaves the gap and "breaks" or "opens" the circuit for the lighting system to interrupt power to the light source 62 and deactivate (e.g. turn-off) the light source 62.

According to any preferred embodiment, the vanity for a vehicle is intended to provide a low-cost, aesthetically-appealing vanity adapted for use in any suitable location within a vehicle (such as a visor panel). The vanity is an assembly comprising a mirror, a lighting system, and a cover panel that is rotationally movable in a plane that is generally parallel to the plane of the mirror so that space requirements necessary for exposing the mirror are minimized. The lighting system includes a light source (such as one or more LEDs or bulbs) and a cover (such as a lens) provided in any suitable size, shape and color. The lens houses the light source, and portions of the positioning device and the switch device, and appropriate circuitry for interconnecting the light source, the switch device and an electrical supply (from a conventional power source within the vehicle). The cover panel is configured to "snap on" to the lens in a manner to permit rotational movement of the cover panel relative to the lens. The vanity is configured for installation within (or attachment to) a panel in the vehicle (such as a visor) by a "snap fit" or "press fit" using suitable connection members (such as posts with retention members which may be hooks, barbs, ridges, etc. that are configured to coact with corresponding apertures in the panel to secure the vanity to the panel). The vanity attaches to the panel in the vehicle in a manner that electrically interconnects circuitry for the lighting system with circuitry provided in the panel to provide a supply of electricity from the vehicle's electrical supply source to the lighting system. The positioning device comprises an electrically conductive member (e.g. a ball, etc.) that is operably coupled to the cover panel and biased for engagement with a portion of the lens having indentations (such as "recesses" or "detents") so that the ball engages (e.g. "seats" within) the detents as the cover panel is rotated with respect to the lens to maintain the cover panel in any one of several positions at or between the open position and the closed position. The switch device comprises a first electrical contact associated with the light source and a second electrical contact associated with the electrical power source of the vehicle. The first and second contacts have a space (e.g. "gap," etc.) at a groove corresponding to the open position so that the ball on the cover panel "bridges" the first and second contacts when the cover panel is rotated to the open position to "close" the circuit for the lighting system and activate the light source. When the cover panel is moved away from the open position, the circuit for the lighting system is "opened" or "broken" and the switch device deactivates the light source.

It is important to note that the construction and arrangement of the elements of the various embodiments of the vanity provided herein is illustrative only. Although only a few exemplary embodiments of the present inventions have been described in detail in this disclosure, those skilled in the art who review this disclosure will readily appreciate that many modifications are possible in these embodiments (such as variations in cover panel configuration, variations in the interfacing structure between the lens and the over panel, and variations in the configuration and integration of the switch device and the positioning device, the shape and size of the mirror, cover panel and lens, electrical interconnection with the visor, mounting arrangements, use of colors, combinations of shapes, etc.) without materially departing from the novel teachings and advantages of the inventions. Further, the vanity may be used in any type of vehicle such as trucks, recreational vehicles, minivans, sport utility vehicles, passenger automobiles, etc. and at any suitable location within the vehicle. Accordingly, all such modifications are intended to be within the scope of the invention as defined in the appended claims.

The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating configuration and arrangement of the preferred and other exemplary embodiments without departing from the spirit of the inventions as expressed in the appended claims.

What is claimed is:

1. A vanity for a visor in a vehicle, comprising:
a mirror fixed to the visor;
a light source coupled to the visor adjacent the mirror;
a panel coupled to the visor for rotational movement in a plane substantially parallel to a plane of the mirror and between a first position where the mirror is substantially covered by the panel and a second position where the mirror is substantially uncovered; and
a switch configured to interface with the light source and the panel to prevent illumination of the light source in the first position and to permit illumination of the light source in the second position.

2. The vanity of claim 1 wherein the panel includes a circular aperture arranged to surround and rotate about the light source.

3. The vanity of claim 2 wherein the light source is fixed to the visor and further comprising a lens configured to cover the light source and rotationally interface with the aperture in the panel.

4. The vanity of claim 3 wherein the visor and the panel and the lens are configured for interconnection by a snap fit arrangement.

5. The vanity of claim 1 wherein the switch comprises a first conductive member coupled to the panel and a second conductive member coupled to the light source.

6. The vanity of claim 1 wherein the first conductive member is resiliently biased into contact with a generally circular track.

7. The vanity of claim 1 further comprising at least one stop member configured to limit the rotational movement of the panel within a predetermined range.

8. A vanity for a visor in a vehicle, comprising:
a mirror fixed to the visor;
a light source coupled to the visor adjacent the mirror;
a panel coupled to the visor for rotational movement in a plane substantially parallel to a plane of the mirror and between a first position where the mirror is substantially covered by the panel and a second position where the mirror is substantially uncovered.

9. The vanity of claim 8 wherein the light source is fixed to the visor and disposed within a circular lens.

10. The vanity of claim 9 wherein the panel includes a circular aperture arranged to surround and rotate about the circular lens between the first position and the second position.

11. The vanity of claim 8 further comprising a switch configured to interface with the light source and the panel to prevent illumination of the light source in the first position and to permit illumination of the light source in the second position.

12. A vanity for a visor in a vehicle, comprising:
a mirror fixed to the visor;
a light source adjacent the mirror;
a cover having a size and a shape configured to substantially cover the mirror;
a positioning system for rotating the cover about the light source and in a plane substantially parallel to a plane of the visor;
a switch interacting with the positioning system to control illumination of the light source, so that rotation of the cover in a first direction exposes the mirror and energizes the light source and rotation of the cover in a second direction conceals the mirror and de-energizes the light source.

13. The vanity of claim 12 wherein the light source is fixed to the visor and the cover includes an aperture that substantially surrounds the light source and is configured to pivot about the light source as the cover is moved in the first direction or the second direction.

14. The vanity of claim 12 wherein the positioning system comprises a resilient member biased to engage a track adjacent the light source.

15. The vanity of claim 14 wherein the track comprises at least one recess configured to receive the resilient member to form a detent for maintaining the cover in a predetermined position.

16. The vanity of claim 14 wherein the switch comprises at least one contact on the track and the resilient member comprises a conductive material configured to engage the contact upon rotation of the cover.

* * * * *